March 9, 1948. E. R. EVANS 2,437,638

STUD AND INSTALLATION THEREOF

Filed Oct. 23, 1942 3 Sheets—Sheet 1

Inventor
EDWIN R. EVANS

By
J. D. Murray
Attorney

March 9, 1948.  E. R. EVANS  2,437,638
STUD AND INSTALLATION THEREOF
Filed Oct. 23, 1942   3 Sheets-Sheet 2

Inventor
Edwin R. Evans
By J. S. Murray
Attorney

March 9, 1948.  E. R. EVANS  2,437,638
STUD AND INSTALLATION THEREOF
Filed Oct. 23, 1942  3 Sheets-Sheet 3
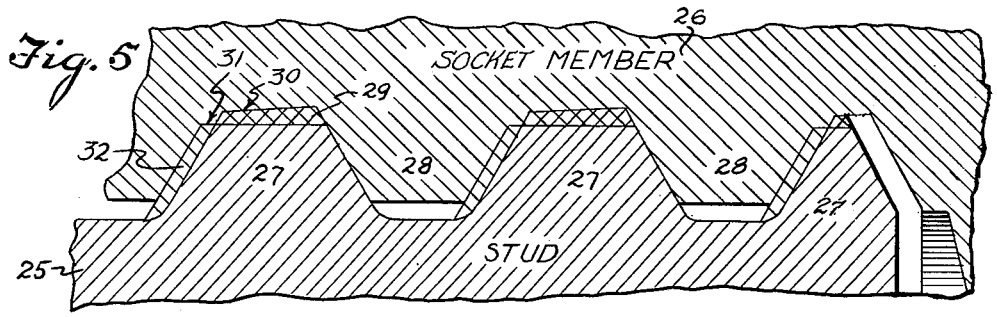
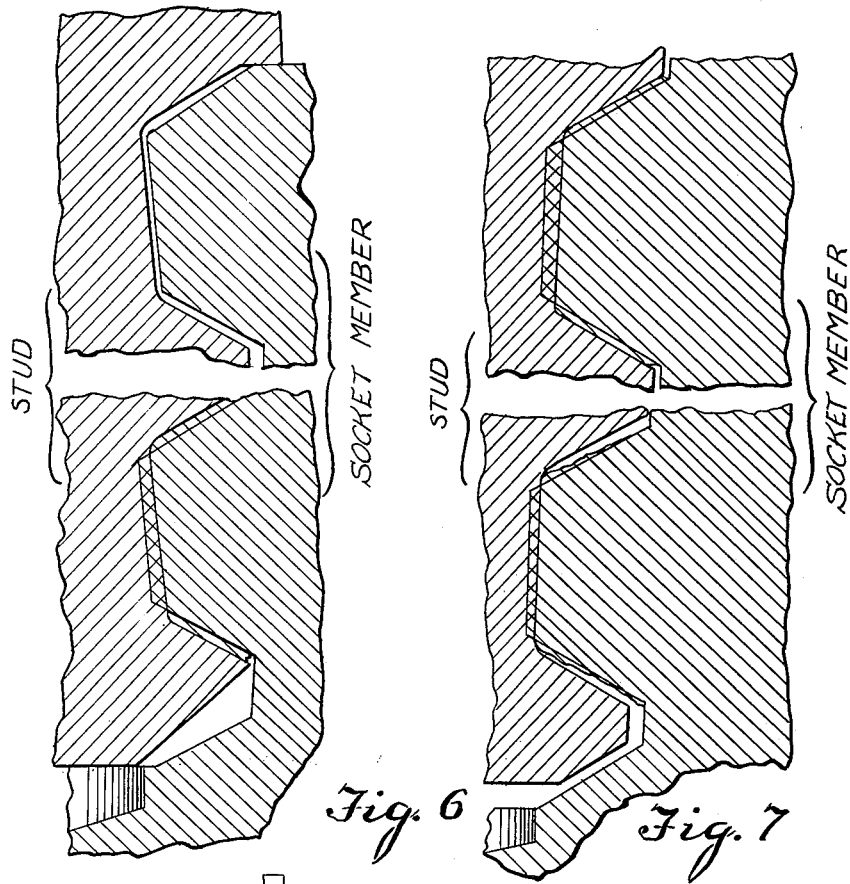
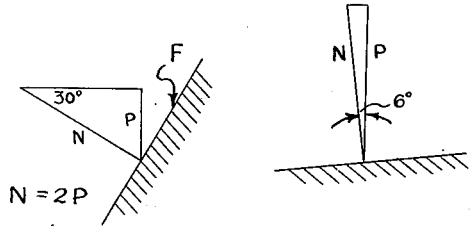
Fig. 8  Fig. 9
Inventor
EDWIN R. EVANS
Attorney Patented Mar. 9, 1948

2,437,638

UNITED STATES PATENT OFFICE 2,437,638

STUD AND INSTALLATION THEREOF

Edwin R. Evans, Orchard Lake Village, Mich., assignor to Dardelet Threadlock Corporation, a corporation of Delaware Application October 23, 1942, Serial No. 463,084

32 Claims. (Cl. 151—14)

This invention relates to screw threads and particularly mated threads inducing a predetermined interference and thus strongly resisting separation. Thus for example stud bolts are threaded to produce considerable interference in setting them in their sockets.

Stud threads are almost invariably V-shaped, an included angle of 60 degrees between the thread flanks being standard under American National practice. Under that practice, the interference requisite to a tight fit occurs between the flanks of interengaged threads. Although A. N. standards have long been followed in U. S. machine practice, the mutilating effect of A. N. threads designed for interference is unduly high, and particularly so under modern quantity production methods of high-speed insertion of studs. Upon analysis, this destructive effect is found primarily due to inclination of the interfering thread flanks. Stress occasioned by interference is in the nature of a band effect exerted by the metal surrounding the tapped opening, such effect being calculable by the well-known formula, $$P = \frac{Ed}{b} \times \frac{(b^2 - a^2)(c^2 - b^2)}{2b^2(c^2 - a^2)}$$

wherein, P=pressure, E=modulus of elasticity of tapped metal, $a$=inner radius of inner cylinder (=0 in case of a solid stud), $b$=outer radius of inner cylinder, $c$=outer radius of outer cylinder, and $d$=amount of excess of outer radius of inner cylinder over inner radius of outer cylinder, or the amount of interference. Due to the inclination of A. N. thread flanks at 30 degrees to a normal to the axis, unit pressure exerted normal to the thread flanks is double that of the band stress inducing that pressure. This relation is hereinafter more fully explained and appears largely responsible for mutilative effect of stresses due to employing A. N. standards for stud interference.

Another evident cause of mutilation aforementioned lies in A. N. practice of locating the void for receiving metal displaced by interference between the crest of the socket thread and the groove bottom of the stud thread. This entails a flow toward the apex of a triangle subject to undue resistance.

An object of the invention is to provide a type of thread establishing interference requisite to the tight fit commonly required for studs, but affording such interference at the root or crest of the screw thread, and thus eliminating multiplication of band pressure characterizing close fits under A. N. practice.

Another object is to provide a cylindrical or approximately cylindrical surface at the groove bottom of a stud thread for interference purposes, said surface being sufficiently extended to avoid high stresses per unit of surface.

Another object is to so provide the voids for receiving metal displaced by thread interference that such metal may enter the voids with materially less flow and under materially less resistance than in stud practice now common.

Another object is to utilize thread interference to effect complete sealing of a tapped opening by a stud inserted therein, so that such opening may break into a chamber confining a gas or liquid without resultant leakage or corrosion.

Another object is to provide an improved thread form for studs, permitting more shallow tapping of the stud sockets than in present practice, whereby necessary removal of metal is reduced by approximately one half, with resultant diminution of tool wear and applied power and increase in feasible rate of tapping.

Another object is to provide a thread form for studs detracting much less from the stud strength than present thread forms, and greatly increasing resistance of studs to fatigue, as compared to present practice.

Another object is to materially improve on A. N. interfering thread practice, while permitting use of taps designed under that practice and further permitting use of A. N. chasers modified by a simple regrinding operation.

Another object is to provide for a much larger number of stud removals and replacements than has heretofore been feasible for studs of a given size, by avoidance of the considerable thread mutilation occurring in prior practice, and in that connection the present improvement is of material defense importance, permitting field replacement of studs without depreciation of fit encountered in prior practice.

Other objects are to materially improve the ironing effect incident to interfering threads, to facilitate rolling and inspection of such threads, and to reduce the tendency of studs, in breaking, to fracture in such close proximity to their sockets that drilling is essential to remove the end portions remaining in the sockets.

These and various other objects the invention attains by the construction hereinafter described and illustrated in the accompanying drawings, wherein:

Figs. 3 to 5 are similar views illustrating various modifications of the invention.

Fig. 6 is a view showing more fully the construction illustrated in Fig. 2, and showing a progressive variation of interference lengthwise of the stud.

Fig. 7 is a similar view showing a modified provision for progressively varying the amount of interference.

Fig. 8 is a force diagram showing extent to which the band stress applies an increased force normal to flank of an A. N. thread.

Fig. 9 is a diagram showing effect of band stress on thread illustrated in Fig. 2.

Figure 1:
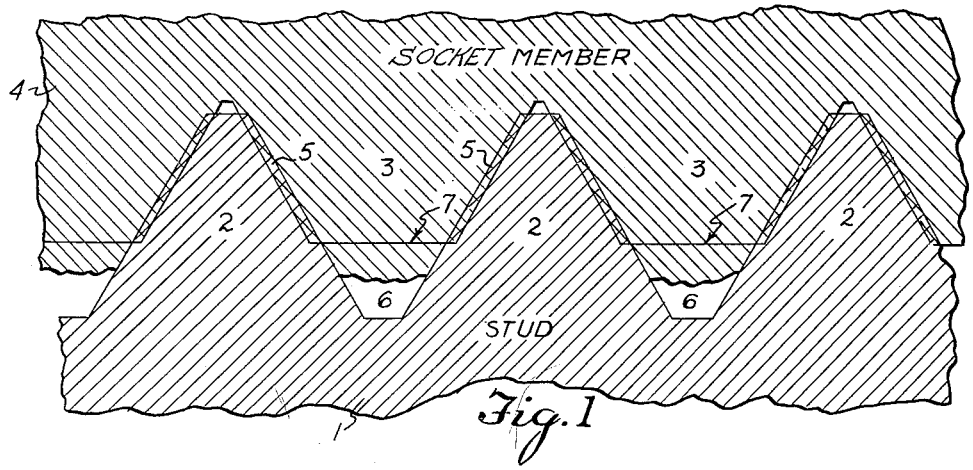
Fig. 1 is a fragmentary axial sectional view of a stud and its socket member as engaged under A. N. practice, now commonly followed when heavy interference is desired.

Referring now more in detail to the views, and first discussing Fig. 1, the stud 1 has a thread 2 mating with the thread 3 of a socket formed in a member 4. Conforming to A. N. stud practice, the included angle between the flanks of the threads is 60 degrees, the angle of the flanks to a normal to the stud axis thus being 30 degrees. The flanks of the two threads interfere as indicated by the double hatched areas 5, and metal displaced from these areas is required to flow into an approximately triangular void 6 provided between the crest 7 of the truncated thread 3 and the groove bottom of the thread 2.

By reference to force diagram shown in Fig. 8, it is evident that the band stress acting normal to the stud axis and represented by line P gives rise to a force N equal to 2P acting normally to the flank shown at F in the diagram. This follows from 30 degree inclination of flank, the sine of 30 degrees being .5 and ratio P/N hence being ½. The band stress being primarily determined by the amount of interference it follows that under A. N. practice if interference is adequate, stresses normal to thread flanks are excessive.

It will be seen from Fig. 1 that metal displacement due to flank interference entails a flow in the thread 3 toward and beyond the original crest 7 of said thread. Thus flowing metal in any area toward the most restricted part of that area sets up undesirable resistance to such flow, and this particularly applies to a V-type thread, where progressive increase of restriction is obviously considerable. Resistance to flow is such that it is not found feasible in A. N. practice to proportion the voids 6 to be completely filled through flow of metal, as will appear by reference to Bureau of Standards 1942 Handbook, "H-28," p. 226, paragraph 1. It follows that a 100 per cent filled or fluid-sealed connection between a stud and its socket is not economically obtainable under A. N. practice.

Figure 2:
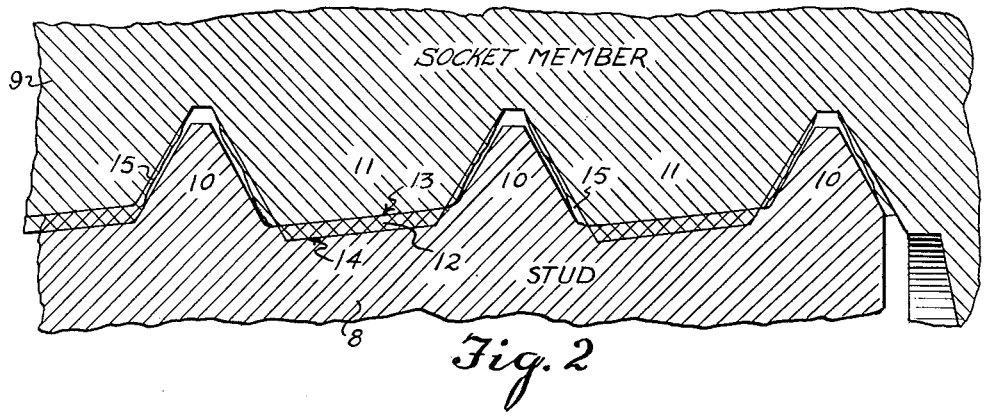
Fig. 2 is a similar view showing use of a thread form securing substantially the same degree of interference as in Fig. 1 but eliminating numerous disadvantages of A. N. practice.

Referring now to Fig. 2, showing a stud 8 inserted in socket formed in a member 9, the thread 10 of said stud mates with thread 11 of the socket. Interference is provided as indicated at 12 between the groove bottom 13 of the stud thread and the crest 14 of the socket thread. Initial voids, as indicated at 15, are provided between the flanks of the two threads but these voids are shown as receiving metal displaced by a lateral flow occurring in the thread 11. While the interfering surfaces of the two threads are approximately cylindrical it is preferred to diverge said surfaces to the axis of the stud at a gradual angle such as 6 degrees. The divergency is in a direction opposed to such tension stresses as are imposed on the stud in use, or in other words, toward the bottom of the socket receiving the stud. Thus the gradual inclination of the interfering surfaces greatly adds to the shearing stress that would be necessary to "strip" the threads, so that despite the much less width of the thread 10 as compared to A. N. practice, the resistance to shear is in fact materially greater than that obtained in A. N. practice. The interfering surfaces, it will be noted, are of considerable axial extent thus reducing the band stress per unit of area.

The considerable spacing of the thread convolutions is of great importance, moreover, in securing a resistance to fatigue far in excess of that afforded by A. N. threads. The convolutions of an A. N. stud are in such close relative proximity (the flanks usually intersecting at 60 degree angle) that adequate provision is lacking for transmission of strains from one to another. The extensive substantially cylindrical interference surface intervening between convolutions of the improved thread provides for such expansion and contraction as will tend to absorb periodic stresses and to avoid fatigue failure. By actual comparative tests it has been ascertained that the improved thread is capable of sustaining periodic stresses for a period many times greater than that producing failure of an A. N. stud of the same size and type. Resistance to fatigue is of constantly growing importance in modern machine practice, and particularly so in aircraft engines, due to high loads and speeds employed and the serious results of failure.

It is important to note that flow of metal resulting from interference accompanying insertion of my improved stud is away from rather than toward the stud axis, in contradistinction to A. N. practice. Thus in Fig. 2, the metal displaced from the crest of the thread 11 flows to flanks of said thread, and since this flow is in the direction of diameter increase it follows that it will involve less distortion of the thread form than the A. N. flow in a reverse direction. Also, as has been pointed out, the A. N. flow is in the direction of progressive restriction, whereas the improved flow is from the crest of the thread 11 toward its relatively wide base. It will be seen that A. N. practice provides a single void spirally coextensive with the crest of the socket thread, whereas my improved construction provides in several of its disclosed forms two voids, as 15, respectively spirally coextensive with the flanks of the socket thread. Thus in A. N. practice there is much less surface distribution of the displaced metal than in the improved construction. It follows that on removal of the improved stud from its socket, the thread of the latter may more nearly elastically return to its original form than is true in A. N. practice. This is one reason that the improved stud may be repeatedly removed and replaced without deterioration of fit, whereas such deterioration in case of A. N. studs is conspicuous.

Figure 2A:
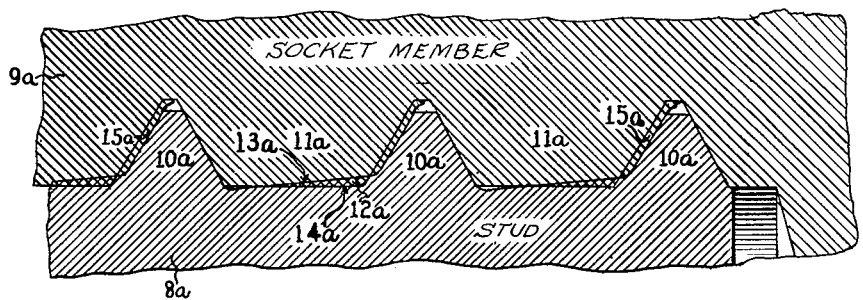
Fig. 2a is a view similar to Fig. 2 but showing the socket member modified as regards its thread form.

While Fig. 2 discloses the interfering faces of both the stud and socket threads diverged to the stud axis, it is to be noted that the same advantage would largely accrue if this divergence is applied only to the interfering stud face. In that case an A. N. tap could be used, without modification, to produce the socket thread, the socket being reamed to avoid necessity of selective assembly. Such a modification is illustrated in Fig. 2a, the stud being designated 8a, the socket member 9a, the stud thread 10a, the socket thread 11a. Interference is provided as indicated at 12a between the groove bottom 13a of the stud thread and the crest 14a of the socket thread. Said groove bottom is diverged at a gradual angle such as 6 degrees to the axis of the stud, the crest 14a being cylindrical. A void 15a is provided between the flanks of the two threads to receive metal laterally displaced in the thread 11a due to the illustrated interference.

Figure 3:
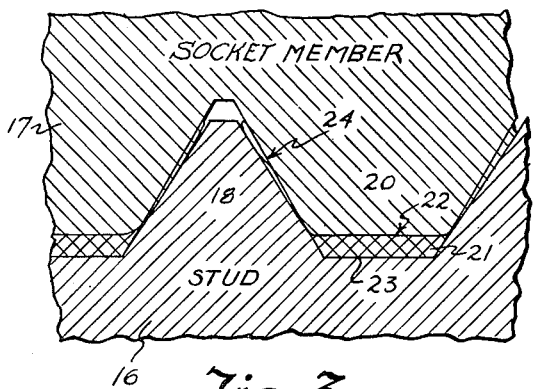

The modification illustrated by Fig. 3 shows a stud 16 received by a socket member 17, the stud and socket having mating threads 18 and 20. Interference occurs as indicated at 21 between the bottom 22 of the stud thread groove and the crest 23 of the socket thread, and in this modification the surfaces 22 and 23 are cylindrical. Between the flanks of the two threads are formed voids 24 which fully accommodate metal displaced in the thread 20 due to interference. Said voids, in this modification, are produced by slightly diverging the mated flanks of the two threads from root to crest of the stud thread and the angle of divergency may be for example 6 degrees. Employing such divergency, the included angle of the socket thread would be sixty degrees as in A. N. practice, and the included angle of the stud thread would be seventy-two degrees. This triangular void at the flanks, it is believed, will permit of a somewhat easier flow of the displaced metal than the type of flank voids shown in Fig. 2. Obviously the construction shown by Fig. 3 would not offer as high a resistance to thread shear as in that shown by Fig. 2 but for many purposes, the high friction derived from the cylindrical interference surfaces would render the stud adequately tight.

Figure 4:
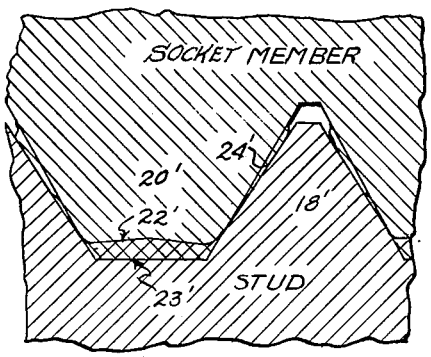

Fig. 4 illustrates a modification differing from that of Fig. 3 only in that the bottom 22' of the groove of the stud thread 18' is arched in a shallow inverted V form, whereby the radius of said bottom is progressively increased from its margins to its spiral center line, the crest 23' of the socket thread 20' being cylindrical. As indicated by the double cross-hatching in Fig. 4, said groove and crest predeterminedly interfere and it is obvious that this construction, by reason of pressure components acting toward both flanks of the socket thread, will somewhat reduce resistance to flow, as compared to construction shown in Fig. 3.

Referring now to Fig. 5, this modification shows a stud 25 received by a socket member 26, the stud and socket having mating threads 27 and 28. In this construction interference occurs as indicated at 29 between the crest 30 of the stud thread and the bottom 31 of the socket thread groove. Said crest is diverged to the stud axis, preferably at a slight angle as for example 6 degrees. This divergency is toward the bottom of the socket and hence in a direction opposed to withdrawal of the stud so that resistance to shear of the socket thread is supplemented by resistance offered by the gradual shoulder formed at 30. As the stud is inserted, the inclination of its interfering thread crest 30 tends to deflect the flow of metal from the interfering area toward the shorter flank of the stud thread where such metal may be received by a void 32 formed for that purpose between such flank and the mating flank of the socket thread 28. This construction improves on A. N. practice in substantially all features brought out in preceding discussion of the invention.

It is a feature of the invention in each of its disclosed forms, excepting that appearing in Fig. 5, that the socket threads may, if desired, be formed with A. N. taps, and it is evident that A. N. chasers may be adapted by a minor grinding operation to cut any of the disclosed tap threads.

The superior ironing effect of the improved construction as compared to A. N. practice follows from the fact that the ironing reaction in A. N. practice is between flanks having a considerable divergence to axis of stud rotation, whereas such reaction is, in the invention, normal or nearly so to such axis, so that the invention lacks the ineffective component of the reaction appearing in A. N. practice.

In construction shown in Fig. 6, root diameter of the stud does not vary from convolution to convolution, whereas the socket is very gradually tapered to progressively reduce its diameter from its outer to its inner end. It follows that the amount of interference may be moderate at the outer end of the socket and a maximum at the inner end. By employing this construction it is assured that the voids of the convolutions nearest the socket bottom will become fully filled while those near the top will be only partially filled. In cases where it is important to fluid-seal the threads, the described construction is desirable, since heavy interference established for a few of the convolutions serves the purpose. It is to be noted in this connection that any attempt to completely fill the voids throughout the length of the threaded connection would require undue accuracy and an undesirably high applied torque to enter the stud in its socket, except in relatively soft or plastic material.

The described provision for obtaining a progressive variation of interference lengthwise of the stud may be variously modified. Thus for example Fig. 7 shows a stud and the engaged socket wall both gradually reduced in diameter from the outer to the inner end of the socket whereby interference is varied axially of the stud, being a maximum adjacent to the outer end of the socket and uniformly decreasing toward the inner end. It is obvious in view of Fig. 6 that if the threaded socket is cylindrical and the stud is slightly tapered toward its inner end to induce a heavy interference with the upper convolutions of the socket thread and little or no interference with the lowermost socket convolutions, a sealing effect will likewise be assured. Of course, the convergency as shown in Fig. 7 secures the reverse of the through bolt effect obtained in Fig. 6 and it is customary therefore to counterbore to a reasonable depth to avoid undue concentration of stresses near the socket mouth.

It is to be noted that the feature of providing a maximum interference for the inner end portion of a stud and progressively relieving the interference toward the outer end, lends itself very well to distribution of fatigue stresses. In a stud employing this feature, an applied load is first taken by the more tightly fitting lower convolutions, and the load would then be taken by the remaining convolutions, in an upward progression, or by a sufficient number thereof to withstand the load.

Such distribution of applied load stresses will materially reduce fatigue failure.

The improved thread forms herein described effect a desirable economy as regards abrasive wheels used to grind chasers, taps and gauges or the threads possessing said forms, since said grinding wheels need not have faces substantially intersecting at sixty degrees as in A. N. practice, but will have cylindrical or approximately cylindrical faces of considerable width between convergent flank faces. This material addition of width to work-engaging rim portion of grinding wheels will very materially reduce wear imposed on such wheels.

Taps and chasers used to produce the improved thread forms will be materially stronger than those designed under A. N. practice, and because of their greater strength, taps and chasers designed for the improved thread forms can be operated at higher speeds than is feasible with A. N. tools for producing same sized threads, where materials permit.

The improved thread forms permit the interfering or most accurate face of a socket thread to be formed in reaming or accurately drilling the socket, thus relieving the tap of an amount of work that will result in multiplying the useful life of the tap many times as compared to A. N. practice.

The wide root or groove bottom face of the improved stud provides for an increased flow of metal as said stud is engaged in its socket, and since such increased flow affords an increase of tolerance limits, the improved construction materially reduces necessity, now prevalent, for selective assembly of studs in their sockets.

The increase of stud strength secured by present improvements, as compared to studs of the same size conforming to A. N. practice, is as high as 51% under torsion and as high as 32% under tension.

For a given interference fit the surface pressure productive of galling is, in the case of my improved thread forms, approximately one-half that arising in A. N. practice, this being due to reduction of angularity of the interfering faces. Also it is to be noted that the improved practice now disclosed places the threaded material under compression for normal loads whereas such materials are under shear for such loads in A. N. practice. Further advantages of the improved thread forms are that the setting gauge may be a straight cylinder and they permit the use of shorter studs due to the more secure connection which they establish.

It is obviously of vital importance in introducing a thread improving on one now highly standardized in the industry to provide for a maximum interchangeability between threaded machine parts of the standard and improved types, as well as taps and chasers used in the standard and improved practice.

Elimination of sharp angles at intersections of convolutions of the stud thread is a decidedly valuable feature of the invention. Such sharp angles in A. N. practice weaken a stud considerably more than is necessary and use of threading tools productive of such angles promotes an abuse of such tools through removal of excessive metal. In the improved construction the dimensions of the groove bottom of the stud thread will be definitely fixed and abuse is avoided.

The fact that improved construction overcomes the tendency of an overstrained stud to fracture in close proximity to its socket is explained as follows. A. N. practice provides a considerably deeper thread on a stud of uniform diameter for retaining it in a socket than is formed on projecting portion of the stud for engagement by a nut. Hence the weakest portion of the stud is that which is threaded to retain it in the socket, and in fracturing at this portion, an A. N. cylindrical stud will fracture at or adjacent to the socket. Because of the much more shallow nature of thread used to retain improved stud as compared to that retaining an A. N. stud of the same size, it is feasible to provide a somewhat lesser depth for the socket-engaging thread of the improved stud than for its nut-engaging thread. Hence the weakest region or that of probable fracture for the improved stud is at its exposed end portion to which the nut-engaging thread is applied.

With particular regard to constructions such as exemplified in Fig. 6 utilizing a slight divergence of one or both of the threaded faces to the stud axis to set up a maximum interference at the inner portion of the socket and secure a progressive reduction of interference toward the mouth portion of the socket, it is to be noted that this permits a tension load acting on the stud to be transmitted to the socket member with better distribution than heretofore, the tightly fitting convolutions near the inner portion of the socket first transmitting stress and the load being then taken in an outward progression by the remaining convolutions. This will tend to reduce the holding stresses in the socket member in proximity to its mouth, securing a through bolt effect in stress distribution, and will materially reduce the likelihood of a mouth portion of the socket member yielding under severe tension load on the stud.

In constructions which progressively increase the interference as a stud enters its socket, there is attained the advantage that accuracy may be readily checked by observing whether or not a given number of turns of the stud entails the intended increase in the torque necessary to turn the stud.

When an A. N. stud is subjected in use to a weaving stress, friction arises between the interfering flank faces of the threads, as is evidenced by production of fine particles of metal. This is evidently due to fact that a weaving stress tends to produce a slight relative play between the interengaged flanks due to their incline. The improved thread forms avoid this friction by establishing the interference between cylindrical or substantially cylindrical surfaces which are practically normal to the faces productive of weaving.

It is an important advantage of the improved form of studs exemplified in Figs. 2, 3, 4, 6, or 7 that they may be tightly fitted in sockets threaded according to either A. N. or the British Whitworth standards, since both the latter are commonly used in current practice.

It is evident that employment of root interference in the various disclosed improved studs exerts a greater tendency toward compacting the adjacent metal in the socket member than has been heretofore derived, due to the radial or substantially radial relation of compressive stresses to the socket.

Tests have proven that all of the discussed features of the improved stud result in a stronger stud connection with no increase in manufacturing cost.

As indicative of the inventive nature of the various described improvements, it is to be noted that the machine industry has adhered to A. N. practice, as to stud threads substantially as disclosed by Fig. 1, for a period in excess of one hundred years despite numerous defects of that practice and without arriving at either a definite identification of such defects or a remedy for same.

The term "interference," as used in this specification and the following claims, has the meaning well recognized in this art that intermeshing threads are proportioned to predeterminedly compel a material flow of metal in one or both threads as they are screwed together.

What I claim is:

1. In combination, a male member and a member having a socket for the male member, said members having mating threads, the crest of one of such threads having a predetermined material interference with the groove bottom of the other thread, the threads being designed to form voids at both flanks of each thread to receive metal displaced through said interference.

2. Interengaged male and female threads of modified V form, the crest of one of said threads having a metal flowing interference with the groove bottom of the other thread, and the flanks of the two threads being relatively divergent, whereby voids are formed between said flanks to receive metal displaced by said interference.

3. Interengaged male and female threads of a modified V form, the crest of one of said threads having a metal flowing interference with the groove bottom of the other thread, and the flanks of the two threads diverging outwardly from the root of the male thread, whereby voids are formed between said flanks to receive metal displaced by said interference.

4. Interengaged male and female threads of modified V form, the crest of the female thread having a metal flowing interference with the groove bottom of the male thread, and the flanks of the two threads being relatively divergent, whereby voids are formed between said flanks to receive metal displaced by said interference.

5. Interengaging male and female screw threads of a modified V form, the crest of one such thread having a metal flowing interference with the groove bottom of the other thread, said crest and groove bottom having a material divergency to the axis of said threads, said threads being relatively proportioned to form a void between confronting flanks of the two threads to receive metal displaced by said interference.

6. Interengaged male and female threads of a modified V form, the included angle between the flanks of the male thread being greater than that between the flanks of the female thread, whereby a void is formed between confronting flanks of the two threads.

7. In combination, a male member and a member having a socket for receiving the male member, said members having mating threads, the crest of one such thread and the groove bottom of the other each being preformed to a width materially exceeding standard practice and entering into a predetermined material interference one with the other, and said threads being relatively proportioned to afford between confronting flanks thereof a space for reception of metal displaced by said interference.

8. In combination, a male member and a member having a socket for receiving the male member, said members having mating threads, the crest of the socket thread and the groove bottom of the male thread each being preformed to a width materially exceeding standard practice and entering into a predetermined material interference one with the other, and said threads being relatively dimensioned to afford between confronting flanks thereof a space for reception of metal displaced by said interference.

9. In combination, a male member and a member having a socket for receiving the male member, said members having mating threads, the crest surface of one of said threads entering into material interference with the groove bottom surface of the other thread when the threads are interengaged, and said threads being relatively dimensioned to afford a void between a flank of one and the confronting flank of the other for reception of metal displaced by said interference, at least one of said interfering surfaces being inclined at an angle less than 45° to the axis of the threads.

10. In combination, a male member and a member having a socket for receiving the male member, said members having mating threads, the crest surface of one of said threads entering into material interference with the groove bottom surface of the other thread when the threads are interengaged, and said threads being relatively dimensioned to afford a void between a flank of one and the confronting flank of the other for reception of metal displaced by said interference, both said interfering surfaces diverging to the axis of said threads at an angle less than 45°.

11. In combination, a male member and a member having a socket for receiving the male member, said members having mating threads, the groove bottom of the male thread and the crest of the socket thread entering into a predetermined material interference when the threads are interengaged, and the threads being relatively dimensioned to afford a void between confronting flanks thereof to accommodate metal displaced by said interference, the said groove bottom of the male thread diverging from the axis of the thread at an angle less than 45°.

12. The combination recited in claim 9, wherein the said divergence is toward the socketed end of the male member.

13. Mating male and female screw threads, the flanks of each thread being convergent at an angle of substantially 60°, the female thread having a crest of a width exceeding the base width of the male thread, and the groove bottom of the male thread being divergent to said crest at an angle of approximately 6° and being adapted to enter into material interference with said crest when the threads are interengaged.

14. Mating male and female screw threads, the flanks of each thread being convergent at an angle of substantially 60°, the groove bottom of the male thread being divergent to the crest of the female thread at an angle of approximately 6° and being adapted to enter into material interference with said crest when the threads are interengaged, a flank of one of said threads being spaced from the confronting flank of the other to provide a void for reception of metal displaced by said interference.

15. In combination, a stud and a member having a socket for receiving the stud, said stud and member having mating threads, the crest surface of one of said threads entering into material interference with the groove bottom surface of the other thread when the threads are interengaged, and said threads being relatively dimensioned to afford a void between a flank of one and the confronting flank of the other for reception of metal displaced by said interference, at least one of said interfering surfaces being inclined at an angle less than 45° to the axis of the threads.

16. In combination, a stud and a member having a socket for receiving the stud, said stud and member having mating threads, the groove bottom of the stud thread and the crest of the socket thread entering into a predetermined material interference when the threads are interengaged, and the threads being relatively dimensioned to afford a void between confronting flanks thereof to accommodate the metal displaced by said interference, the crest of the socket thread defining a cylinder coaxial with the thread and the groove bottom of the stud thread diverging with respect to said axis and to the said crest at an angle less than 45°.

17. The combination recited in claim 16, wherein the said divergence is toward the socketed end of the stud.

18. In combination, a male member and socket member having mating screw threads, the crest of the socket thread being preformed to a width materially in excess of standard practice, and extending substantially parallel to the axis of the threads in the direction of such width, the groove bottom of the male thread having a predetermined acute divergency to said axis, and said crest and groove bottom having a material metal-flowing interference when the threads are engaged so as to resist escape of the male member, the confronting flanks of said threads jointly forming a void to receive metal displaced by said interference.

19. In combination, a bolt and a member apertured to receive the bolt having mating threads of a modified V-form and of approximately equal depth, the maximum thickness of the aperture thread materially exceeding the maximum thickness of the bolt thread, with a resulting tendency toward relative weakness in the bolt thread, the root of the bolt thread having an interference with a crest of the socket thread when the threads are inter-engaged sufficient to compensate for the relative weakness of the male thread and said interfering crest and root being diverged to the axis of said threads toward the bottom end of the bolt to increase the resistance to a shearing escape of the bolt.

20. In combination, a male member and a member having a socket for receiving the male member, said members having mating threads, the crest of the socket thread and the groove bottom of the male thread each being preformed to a width materially exceeding standard practice and entering into a predetermined material interference one with the other and the groove bottom of the male thread diverging at an angle less than 45° to the axis of said thread, and said threads being relatively dimensioned to afford between confronting flanks thereof a space specifically proportioned with respect to the said interference for reception of the metal displaced by said interference.

21. In combination, a male member and a socket member having mating screw threads, the crest of the socket thread being preformed to a width materially in excess of standard practice and extending substantially parallel to the axis of the threads in a direction of such width, and the groove bottom of the male thread having a predetermined acute divergency to said axis, said crest and groove bottom having a material metal-flowing interference when the threads are inter-engaged to resist displacement of the male member, and the flanks of said threads being relatively spaced to provide a void for reception of metal displaced by said interference.

22. In combination, a bolt and a member apertured to receive the bolt having mating threads of a modified V-form and of approximately equal depth, the maximum thickness of the aperture thread materially exceeding the maximum thickness of the bolt thread, with a resulting tendency toward relative weakness in the bolt thread, the root of the bolt thread having an interference with the crest of the socket thread when the threads are interengaged sufficient to compensate for the relative weakness of the male thread and the said interfering root of the bolt thread diverging from the axis of said threads toward the bottom end of the bolt to increase resistance to a shearing escape of the bolt.

23. In combination, a male member and a member having a socket for the male member, said members having preformed mating threads, the crest of one of such threads having a predetermined material interference radially with the groove bottom of the other thread and said groove being of greater width than the said interfering thread and thereby providing space at the thread flank for reception of metal displaced through said interference.

24. In combination, a male member and a member having a socket for the male member, said members having preformed mating threads, the crest of one of such threads having a predetermined material interference with the groove bottom of the other thread and the interfering surfaces of said crest and groove bottom exhibiting non-conforming contours, said groove being of greater width than the said interfering thread and thereby providing space at the thread flank for reception of metal displaced through said interference.

25. In combination, a male member and a member having a socket for the male member, said members having preformed mating threads, the crest of one of such threads having a predetermined material interference with the groove bottom of the other thread and said groove having, over at least a major part of its depth, a greater width than the said interfering thread and providing space at the thread flank for reception of metal displaced through said interference.

26. In combination, a male member and a member having a socket for the male member, said members having preformed mating threads with flanks converging throughout toward the crests of the threads, the crest of one of such threads having a predetermined material interference with the groove bottom of the other thread and said groove bottom being of greater width than the said interfering thread and providing space at the thread flank for reception of metal displaced through said interference.

27. In combination, a male member and a member having a socket for the male member, said members having mating threads, the crest of one of such threads having a predetermined material interference with the groove bottom of the other thread and said threads being designed to afford space between confronting flanks thereof to receive metal displaced through said interference, the magnitude of said space bearing a predetermined relation to said interference so that at least one of the flanks of said interfering thread shall be spaced throughout from the confronting flank of the other thread when the said crest enters into interfering engagement with the groove bottom.

28. In combination, a male member and a member having a socket for receiving the male member, said members having mating threads, the groove bottom of one of such threads being preformed to a width materially exceeding standard practice and entering into a predetermined material interference with the crest of the other thread, said other thread throughout substantially its entire height being of materially lesser width than the width of the said groove, so as to afford between confronting flanks of said threads a space for reception of metal displaced by said interference.

29. Mating male and female screw threads, the crest surface of one of said threads entering into material interference with the groove bottom surface of the other thread when the threads are engaged, said threads being relatively dimensioned to afford a void between a flank of one and the confronting flank of the other for reception of metal displaced by said interference, and at least one of said interfering surfaces being inclined at an angle of less than 45 degrees to the axis of the threads.

30. Interengaging male and female screw threads of a modified V-form, the crest of one such thread having a metal-flowing interference with the groove bottom of the other thread, said crest and groove bottom having a material divergency to each other in the axial direction, and said threads being relatively proportioned to form a void between confronting flanks of the two threads to receive metal displaced by said interference.

31. An externally threaded member having a thread of modified V-form, said thread-form comprising a thread root formed for interference with the crest of an engaged mating thread to displace metal, said thread being predeterminedly relatively proportioned from the thread root to the thread crest to form a void between the thread flank and the conforming flank of an engaged mating thread when the thread root is engaged by the thread crest of said engaged mating thread.

32. A male screw thread designed for interfering engagement with a preformed companion female thread, said male thread having a minor diameter sufficiently greater than the minor diameter of the female thread to insure a material radial interference between the threads, the flanks of said male thread converging at an angle of approximately 60 degrees, and the groove bottom of said male thread being wider than in standard practice and having rounded junctures of substantial radii with said flanks.

EDWIN R. EVANS.

REFERENCES CITED

The following references are of record in the file of this patent:

UNITED STATES PATENTS

| Number | Name | Date |
| --- | --- | --- |
| 597,000 | Higbee | Jan. 11, 1898 |
| 1,016,897 | Ryan | Feb. 6, 1912 |
| 1,905,869 | Hoke | Apr. 25, 1933 |
| 1,982,737 | Judge | Dec. 4, 1934 |
| 2,269,476 | Poupitch | Jan. 13, 1942 |
| 1,809,758 | Rosenberg | June 9, 1931 |

FOREIGN PATENTS

| Number | Country | Date |
| --- | --- | --- |
| 508,867 | Great Britain | July 7, 1939 |